3,403,467
FISHHOOK DEVICE
Howard Ju, 301 McCain St., Greenwood, Miss. 38930
Filed Dec. 9, 1966, Ser. No. 600,561
9 Claims. (Cl. 43—15)

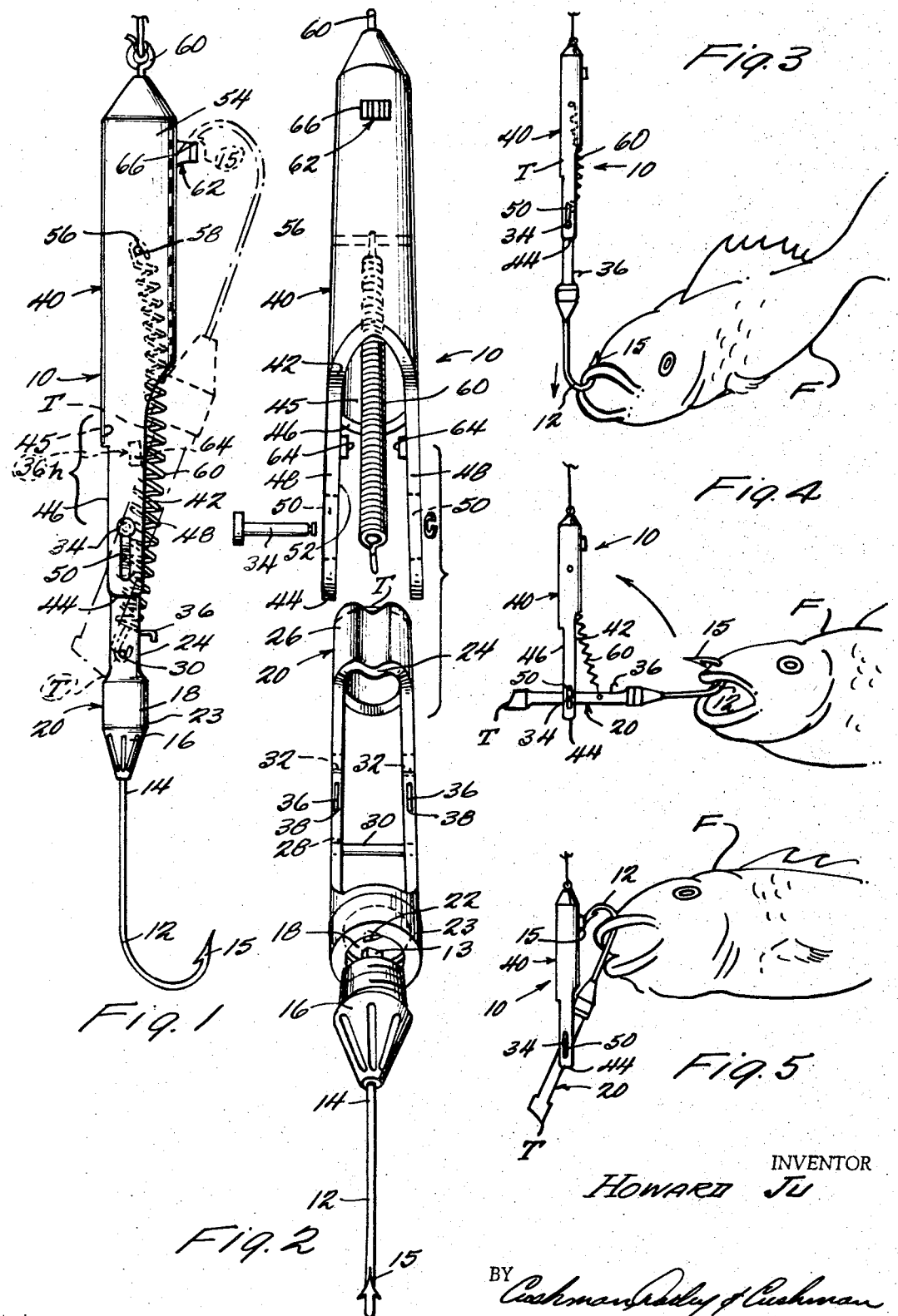

The present invention relates to a fishhook that includes a curved, barbed portion and an elongated shank extension pivotally connected thereto by means which allow the hook shank and shank extension to be set in alignment then to be sprung by the pulling action of a hooked fish, to cause spring urged pivoting of the two hook portions toward one another and into positive, latching engagement to prevent escape of the fish once hooked.

The concept of a trap hook intended to latch into a fish after the fish has struck the hook, or to close upon itself to encircle the puncture made near the mouth of the fish as it takes the hook, is already well known among fishermen. However, prior art trap hooks often either fail to work or become so embedded in the fish that they are difficult to remove without substantially damaging the flesh of the fish.

Accordingly, the present invention has as an important object the provision of an improved trap hook which works reliably and does not tend to damage a fish more than a conventional non-trap fishhook.

A more general object of the invention is the provision of an improved fishhook which, when used, is much more likely to prevent escape of a fish once hooked, than are conventional hooks.

These and further objects of the invention as well as the principles and scope of applicability thereof will become more clearly apparent during the course of the following detailed discussion which is keyed from time to time to the preferred embodiment that is shown in the attached drawings.

In the drawing:

FIGURE 1 is a side elevation view of an improved fishhook according to the present invention;

FIGURE 2 is an exploded elevation view of the fishhook of FIGURE 1;

FIGURES 3–5 are sequential perspective views illustrating the operation of the fishhook of FIGURES 1 and 2, showing a fish taking the hook and being trapped by the hook as it springs shut.

The improved fishhook device 10 includes a conventional bent and barbed hook element 12 which may be configured for attachment of conventional natural or synthetic bait. The hook element 12, shank 14 terminates in a cooperative demountable securement 16 such as an externally threaded collar having an axially upward non-circular projection 13. The threaded collar 16, projection 13 is adapted to be cooperatively received in one end 18 of a generally tubular first shank extension element 20, provided with a non-circular socket at 22 and a nut 23 keyed on the end 18 and having internal threads for securement to the collar 16. Thus the hook element 12 can easily be replaced by a new one or by others of varied shape and use but will not accidentally unscrew. The first shank extension element 20 has a longitudinally elongated port 24 along the front thereof, facing outwardly in the same sense that the curved, barbed part 15 of the hook element 12 projects from its shank 14. The port 24 terminates short of both ends 18, 26 of the element 20. Above the port 24, the element 20 is depressed to the end 26 to provide a spring sliding path as will appear. Near the lower end 18 of the element 20, a diametrically extending opening 28 is formed which receives a lateral pin 30. At a distance h down from the upper end 26 of the element 20, a diametrically extending opening 32 is formed which receives a lateral pin 34 that projects outwardly from the outer surface of the element 20. The latter element is completed by a pair of curved catches 36 which project forwardly and upwardly from fixed mountings 38 at either side of the port 24, intermediate the longitudinal extent of the port 24.

The improved fishhook device 10 also includes a second, upper shank extension element 40, that is shown as being generally tubular. A first longitudinally extending port 42 is formed in the element 40 extending upwardly from juncture with the element 40 lower end 44, along about one-third of the length of the element 40 on the front thereof. Diametrically opposed to the port 42, a second longitudinally extending port 46 is formed in the element 40 extending upwardly from juncture with the element 40 lower end 44 through a shorter distance than the port 42 to define a strike plate area 45 at the back of the element 40 just above the upper extent of the port 46. The porting of the tubular element 40 as just described, defines two diametrically opposed, downwardly longitudinally directed fingers 48, each provided with a longitudinally elongated slot 50 near its lower extent. The slots 50 are diametrically opposed and in lateral alignment. The shank extension elements 20 and 40 are of smaller and larger diameter respectively and assembled to one another by slipping the upper end region of the former into the lower end of the throughbore 52 of the latter. The lateral pin 34 is then inserted to project through the slots 50 and bores 32 and acts as a pivot pin or hinge between the shank extension elements 20 and 40.

Near its upper end 54, a diametric opening 56 is formed laterally through the upper shank extension element 40. The opening 56 receives a lateral pin 58. Conventional eye means or the like 60 are affixed to the upper end 54 of the element 40 for attachment of the fishhook device 10 to a fishing line.

A spring 60 is mounted in tension between the lateral pin 58 on the element 40 and the lateral pin 30 on the element 20. Intermediate these pins, the spring exits laterally from the front of the element 20 through the port 24 and enters the bore of the element 40 through the port 42 above the upper end of the element 20. A metal coil spring and an elastic rubber-band are examples of articles useful for the spring 60.

It is now worthwhile to note that when the device 10 is assembled as shown in FIGURE 1, the spring 60 tends to draw the elements 20 and 40 axially toward one another thus pulling the element 40 downwardly until the pin 34 engages the upper ends of the slots 50. Because the spring is bowed forward centrally by having to pass in front of the upper end of the element 20, the tensioned spring 60 also tends to jack-knife the lower shank extension element 20 forwardly and upwardly about the pivot pin 34. However, when the pivot pin 34 is in engagement with the upper ends of the slots 50 the upper tip T of the element 20 engages the striker plate 45 and prevents such jack-knifing. Conversely, as will be explained hereinafter with reference to FIGURES 3–5, when the element 20 is pulled downwardly so the pivot pin 34 is near or in engagement with the lower ends of the slots 50, the tip T is laterally adjacent the port 46, free of the striker plate 45. Restorative forces of the spring can then jack-knife the element 20 sending the tip T rearwardly through the port 46 and the hook barb into adjacency with the front of the upper shank extension element 40 at 62. The device 10 as illustrated is completed by opposed nubs 64 on the insides of the fingers 48 in position to be partly encircled by the respective catches 36 upon jack-knifing of the device 10; and by an omega-shaped forwardly opening catch 66 fixedly mounted on the front of the element 40 at the above-mentioned point 62.

When the device 10 is in use on a fishing line, it is first disposed in the FIGURE 1 position by aligning the elements 20, 40 and placing the tip T against the front of the strike plate 45. When a fish F takes the hook at 15 and pulls, the spring 60 stretches allowing the element 20 to be pulled downwardly with respect to the element 40. The tip T then slips through the port 46 and the device 10 jack-knifes as progressively shown in FIGURES 3-5. In so doing, the catches 36 frictionally ride over and become disposed behind the nubs 64 and the hook barb 15 enters the catch 66. The porting of the element 40 at 42 allows the element 20 to jack-knife to a more acute angle about the pivot pin 34 since the element 20 can pivot through the port 42 obliquely into the bore of the element 40.

Upon reeling in the fish F, the angler can remove it from the device 10 forcing the element 20 back toward its FIGURE 3 position, over-riding the nubs 64 with the catches 36, then unhooking the fish in the usual manner. The device 10 can then be reset as explained above in connection with FIGURES 1-3. When the device 10 is being stored in a tackle box or jacket pocket, or is otherwise not in use, it may conveniently be disposed in its FIGURE 5 orientation so that the spring 60 is under less stress and the barbed part 15 of the hook is protected by the catch 66 so it will not snare a hand unwarily put near it.

It should be apparent that the device 10 can be made of many materials, particularly those common to the manufacture of fishhook devices. For instance, the elements 20 and 40 can be made of wood, plastic material or non-rusting metal. Although these parts have been described as being tubular, it should be apparent that one or both could be made of solid rod material configured to provide the described ports and fastening points. The feasibility of other modifications will now occur to those skilled in the art; for instance, the slots and diametric opening for the pivot pin 34 could be on opposite elements than as shown and described.

I claim:

1. A fishhook device comprising in combination: a curved hook element having barb means at one end and a shank at the opposite end thereof; a first elongated shank extension element having means at one end for securement of said hook element shank thereto; a second elongated shank extension element having means at one end thereof for securement to a fishing line; pivot means joining the second shank extension element near the opposite end from said one end, to an intermediate portion of said first shank extension element for movement of the first shank extension element between a first position wherein it is in generally axial alignment with the second shank extension element and a second position wherein the first shank extension element's longitudinal axis forms a small acute angle with the longitudinal axis of the second shank extension element and the hook element barb means is closely adjacent the second shank extension element; fish releasable latch means for maintaining said first shank extension element in said first position; and tensioned spring means secured to said first and second shank extension elements for urging said first shank extension element to said second position upon release of said latch means by a fish striking said hook element.

2. The fishhook device of claim 1 wherein said second shank extension element includes two diametrically opposed axially extending arms at said opposite end; said first shank extension element opposite end and the intermediate portion of said first shank extension adjacent said opposite end are received between said two arms; said pivot means including diametrically opposed, longitudinally elongated slots formed in said arms and opposed bores formed in said intermediate portion, and a lateral pivot pin projecting through both of said slots and bores, whereby said first shank extension element is axially movable into a first condition of greater and and a second condition of less coextension with said second shank extension element.

3. The fishhook device of claim 2 wherein, said second shank extension element includes strike plate means, when said first shank extension element is in said first condition said opposite end of said first shank extension element engages said strike plate means on said second shank extension element to prevent pivoting of said first shank extension element to said second position and wherein when said first shank extension element is in said second condition, said opposite end of said first shank extension element is free of said strike plate means and said first shank extension element is thereby freed to pivot to said second position.

4. The fishhook of claim 3 wherein the tensioned spring means comprises an elongated spring element secured to said first and second shank extension elements at the spring element ends and passes in front of said pivot means.

5. The fishhook device of claim 1 further including a laterally outwardly diverging catch on said second shank extension element positioned and configured to receive said hook element barb means as said first shank extension element is moved to said second position thereof.

6. The fishhook device of claim 1 further including latch and keeper means on said first and second shank extension elements positioned and configured to cooperatively engage upn movement of said first shank extension element to the second position thereof to prevent unintended pivoting movement of said first shank extension element back toward said first position thereof.

7. The fishhook device of claim 1 wherein the first-mentioned securement means removably secures said fishhook element to the first shank extension element.

8. The fishhook device of claim 1 wherein both of the shank extension elements are generally tubular, the outer diameter of the first shank extension element being smaller than the internal diameter of the second shank extension element whereby the first shank extension element opposite end is receivable in the trough bore of the second shank extension element at the opposite end of the latter.

9. The fishhook device of claim 8 wherein the second shank extension element has port means defining a scoop-like cut-out on the front thereof communicating with the second shank extension opposite end; said first shank extension near said one end thereof entering said cut-out when moving to said second position thereof.

References Cited

UNITED STATES PATENTS

| 1,859,944 | 5/1932 | Waitt | 43—15 |
| 2,213,624 | 9/1940 | Cole | 43—37 |
| 3,060,615 | 10/1962 | Spets | 43—15 |
| 3,163,956 | 1/1965 | Krutsch | 43—35 |

WARNER H. CAMP, *Primary Examiner.*